INVENTOR.
Richard E. Widdowson
BY
Carl A. Stickel
ATTORNEY

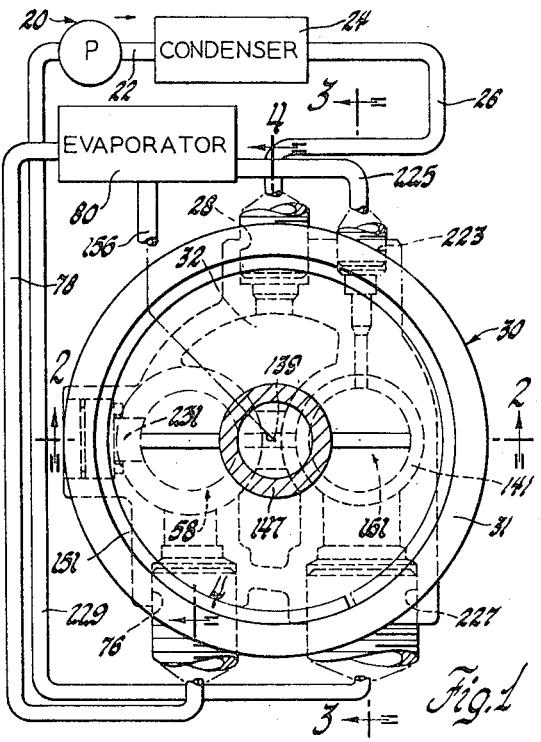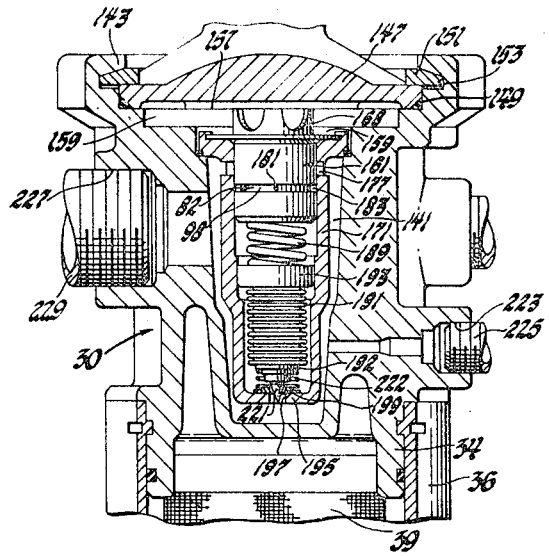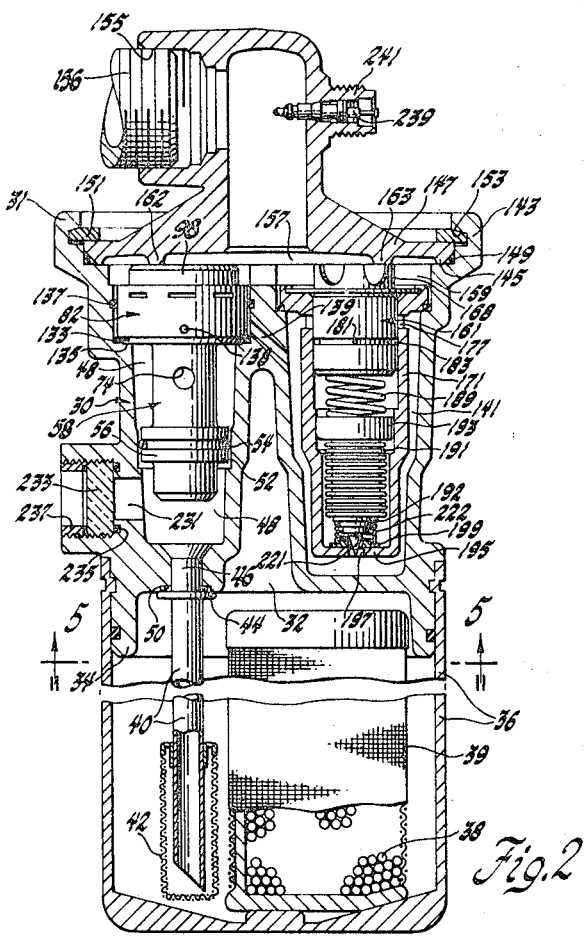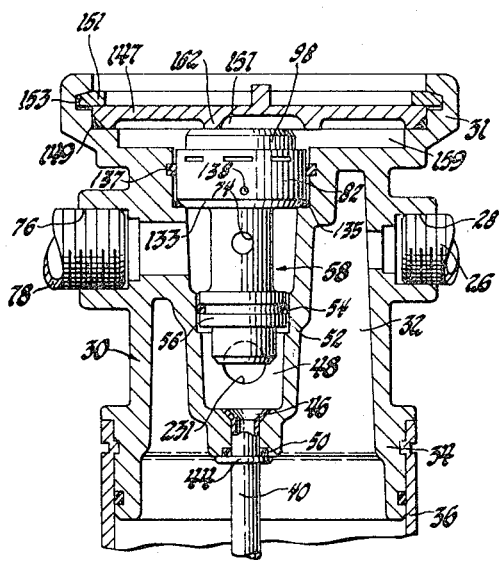

United States Patent Office 3,525,234
Patented Aug. 25, 1970

1

3,525,234
RECEIVER CONTAINING A THERMOSTATIC EXPANSION VALVE AND SUCTION THROTTLING VALVE
Richard E. Widdowson, Dayton, Ohio, assignor to General Motors Corporation, Detroit, Mich., a corporation of Delaware
Filed Aug. 13, 1968, Ser. No. 752,328
Int. Cl. F25b 41/04
U.S. Cl. 62—217                                          10 Claims

ABSTRACT OF THE DISCLOSURE

In the preferred form, a housing closed by a removable wall contains parallel cavities extending from the wall having sealed therein a bodily removable thermostatic expansion valve and also a bodily removable suction throttling valve. A cup-shaped enclosure has its rim sealed to the opposite side of the housing from the removable wall and contains a desiccant in a porous bag so that it serves both as a receiver and dehydrator. The receiver contains a tube and the housing contains passages forming all the desired connections between the valves and provides for all the necessary connections to the remaining components of an automotive refrigerating system.

---

With air conditioning systems, more cars are provided with modern compact V-8 engines which leave little room for the engine and automotive accessories as well as the air conditioning system. It therefore becomes a difficult problem to find a satisfactory location for the various parts of an air conditioning system where they can be conveniently serviced without interfering with the service to the engine and the other accessories within the engine compartment.

It is an object of this invention to provide an inexpensive compact unit combining with a receiver, a readily and bodily removable thermostatic expansion valve and a readily and bodily removable suction throttling valve with all the desirable connections between the valves and the components being embodied in the unit.

Further objects and advantages of the present invention will be apparent from the following description, reference being had to the accompanying drawings, wherein preferred embodiments of the present invention are clearly shown.

In the drawings:

FIG. 1 is a top view of a receiver combined with expansion and throttling valves illustrating one form of my invention together with a diagrammatic representation of the remaining parts of the refrigerating system;

FIG. 2 is a diametrical vertical section taken along the lines 2—2 of FIG. 1;

FIG. 3 is a fragmentary vertical sectional view taken along the line 3—3 of FIG. 1;

FIG. 4 is a fragmentary vertical irregular sectional view taken along the line 4—4 of FIG. 1;

Figure 5:
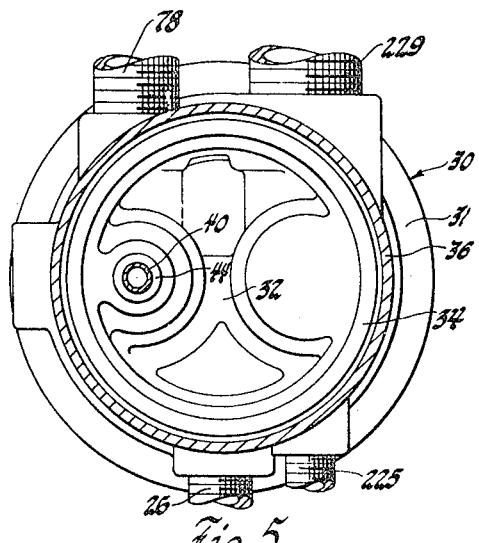
FIG. 5 is a horizontal bottom sectional view taken along the line 5—5 of FIG. 2.
Figure 6:
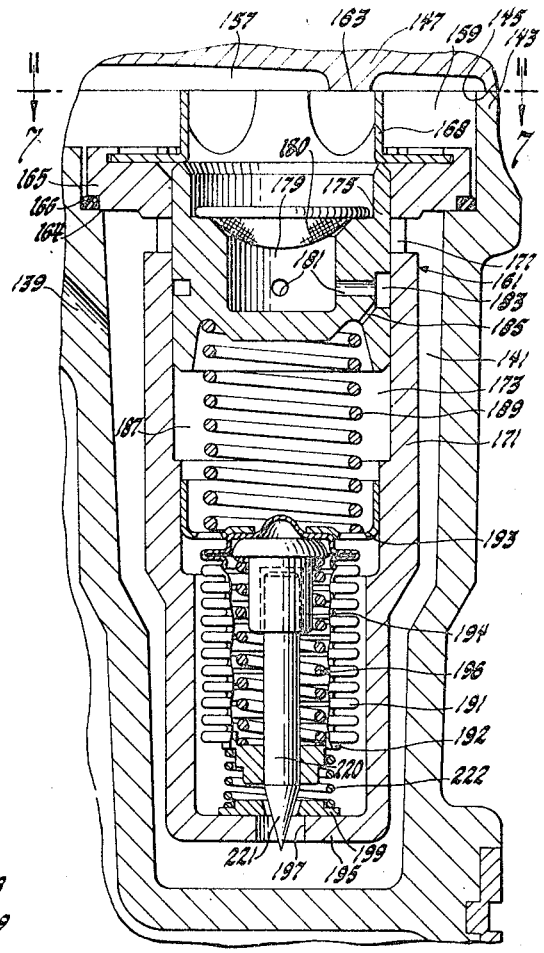
FIG. 6 is a vertical sectional view of the suction throttling valve shown in FIGS. 2, 3, and 7 taken along the line 6—6 of FIG. 7.

Referring now more particularly to FIG. 1, there is shown a refrigerating system including a compressor 20, diagrammatically illustrated, which is intended to be driven by the automobile engine. Its outlet is connected by conduit 22 to the condenser 24 which has its outlet connected by the conduit 26 to the entrance 28 of the unitary structure 30 which houses the valves and the connections between them as well as a desiccant and a receiver. This entrance 28 forms the inlet to a large passage 32 in an aluminum casting 31 having an endless shoulder 34 extending around its bottom to which is press fitted and sealed a cup-shaped container 36 which forms a receiver. Included in the container 36 is a desiccant 38 contained in a porous enclosure or bag 39 which serves as a dehydrator for the refrigerant.

Extending substantially to the bottom of the cup-shaped member 36 is a vertical tube 40 having an entrance at the bottom which is enclosed by a fine wire screen 42. The vertical tube is provided with an annular shoulder 44 and a projection 46 which extends up into the vertical chamber 48 (see FIG. 4) which is formed in the housing 30. The upper end of the extension is flared over the adjacent wall surface to hold it in place. This vertical chamber has a seal 50 at the bottom against which is fitted the shoulder 44 to provide a seal with the tube 40.

Figure 8:
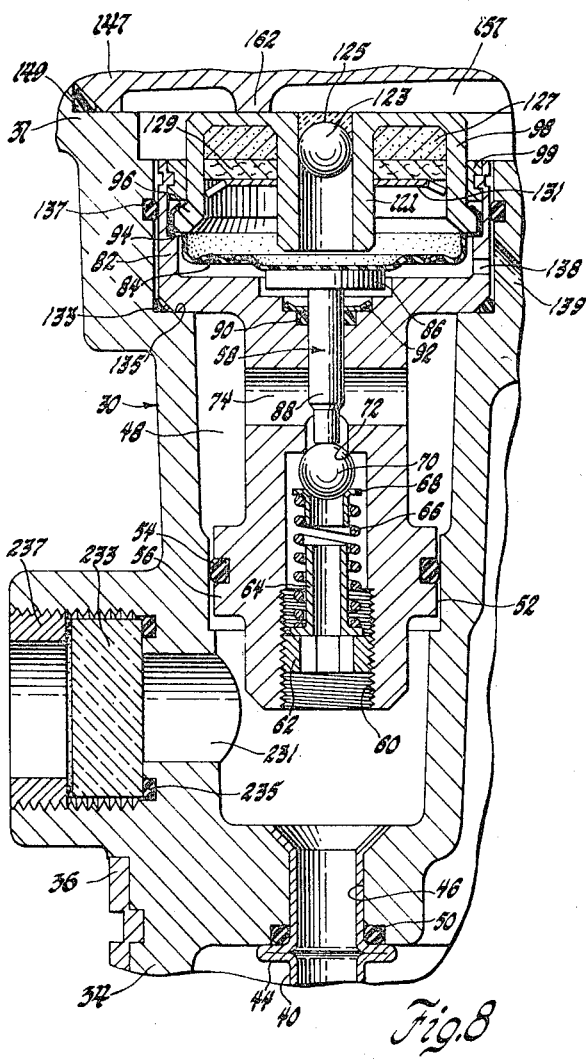
FIG. 8 is a vertical sectional view through the thermostatic expansion valve shown in FIG. 2.
Figure 7:
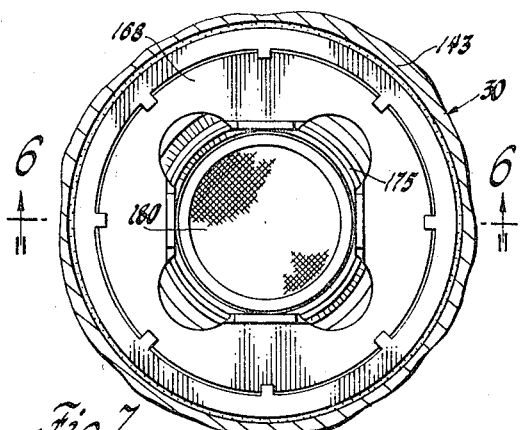
FIG. 7 is a top sectional view of the suction throttling valve taken along the line 7—7 of FIG. 6.

The chamber 48 is provided with a restricted annular portion 52 which forms a seal in cooperation with the O-ring 54 (see FIG. 8) upon the lower portion 56 of the bodily removable thermostatic expansion valve 58. This thermostatic expansion valve 58 has a threaded cavity and passage 60 containing a perforated threaded adjusting disc 62 which is provided with a lower spring retainer 64 supporting the bottom of the coil spring 66. The top of the spring 66 is provided with an upper spring retainer 68 bearing upwardly against the ball valve 70 to normally hold the ball valve 70 against the seat 72 provided by a shoulder in the upper continuation of the threaded cavity and passage 60. A transverse outlet passage 74 provides direct communication with the outlet 76 provided in the housing 30 for direct connection with the liquid line 78 connecting with the inlet of the evaporator 80.

The thermostatic automatic expansion valve 58 has an integral enlarged upper portion 82 containing an operating diaphragm 84 which has its central portion resting upon the enlarged head 86 of the operating pin 88 extending through an O-ring seal 90 and a coaxial passage into engagement with the ball valve 70. The seal 90 is conveniently held in place by a Belleville washer 92 located in an enlarged portion of the cavity. The enlarged portion 82 of the valve body is provided with an annular shoulder 94 which supports the outer rim of the diaphragm 84 which is curled around the bead 96 at the bottom of the inverted cap member 98. The inverted cap member 98 is held in place by the ring 99 which may be press fitted and staked. The inverted cap member 98 has a downwardly extending integral tubular portion 121 which serves as a stop to limit the upward movement of the diaphragm 84.

This tubular portion 121 is closed by a ball 123 which is sealed by solder 125. The inverted cup-shaped member 98 contains a quantity of adsorbant 127 such as activated charcoal which is held in place in the cup-shaped member by a porous disc member 129 which, in turn, is held by a perforated Belleville type member 131. This forms a temperature responsive chamber which contains a suitable refrigerant such as one known as R-22 ($CHClF_2$, monochlorodifluoromethane) which is adsorbed and evolved from the adsorbent 127 as its temperature falls and rises.

The bodily removable thermostatic expansion valve 58 has a beveled shoulder 133 which seals itself against the shoulder 135 in the vertical cavity 48. Above the shoulder 135 there is provided a groove containing an O-ring seal 137 which makes sealing engagement with the upper portion of the expansion valve 58. This provides a sealed chamber which communicates through the restricted passage 138 in the expansion valve with the sealed chamber directly below the diaphragm 84. The vertical chamber 48 is also provided with a small passage 139 connecting with a second parallel vertical chamber 141 housing the suction throttling valve to provide a pressure equalizing connection for the chamber below the diaphrgam 84 through the passages 138 and 139.

Above the thermostatic expansion valve, the housing 30 is provided with an enlarged portion 143 containing a shoulder 145 receiving a removable wall 147 and sealed by a seal ring 149 and held in place by a C-wedge-shaped snap ring 151 normally held in a groove 153. The removable wall 147 is provided with an inlet connection 155 connecting with the suction line 156 extending from the top of the evaporator 80. The removable wall 147 is provided with a notch 157 connecting the vertical cavities 48 and 141 to assure free flow in the chamber 159 formed above the top of the suction throttling valve 161 and the expansion valve 58 beneath the removable wall 147. Through the flow of cold vapor from the evaporator into this chamber, the temperature of the adsorbent 127 and the gas pressure are controlled in the chamber above the diaphragm 84. The removable wall 147 when removed provides complete access to the thermostatic expansion valve 58 and to the vertical chamber 141 containing the suction throttling valve 161. The thermostatic expansion valve 58 is held in its cavity 48 by a projection 162 and the suction throttling valve 161 is held in place by the projection 163 which engages the perforated plate 168.

The suction throttling valve 161 fits into the vertical cavity 141 which is parallel to the thermostatic expansion valve 58 and its cavity 48. The aluminum housing 30 forms a heat exchanger between the warm liquid flowing through the thermostatic expansion valve 58 and the cold suction gas flowing through the suction throttling valve 161. The suction throttling valve 161 includes a one-piece cup-shaped housing 171 containing an enlarged bore 173 which slidably receives the piston valve 175. This piston valve is adapted to cover and uncover the ports 177 in the side walls of the housing 171. This piston valve 175 contains a central recess 179 having side outlets 181 connecting with an annular groove 183 which, in turn, is connected by a restricted passage 185 to the spring chamber 187 containing a supporting coil spring 189 beneath the piston 175. The spring 189 together with the pressure in the spring chamber 187 controls the position of the piston 175 in conjunction with the pressure applied to the top of the piston beneath the perforated plate 168. The central recess 179 is covered by a concave screen 180 which stops the flow of any particles in the refrigerant. The housing 171 has an annular upper flange 165 resting upon an annular shoulder 164 sealed by an O-ring seal 166 between them which seals the valve 161 within the vertical cavity 141.

This pressure in the spring chamber 187 is controlled by a sealed bellows 191 located beneath the spring chamber 187. The top of the bellows 191 is supported by and bonded to a cup-shaped press fitted perforated bellows support 193 which also serves as a spring retainer for the bottom of the spring 189. The housing 171 is provided with a closing wall 195 at the bottom containing an outlet opening 197 and a self aligning valve seat disc 199 for the valve 220. This valve 220 has a cone shaped lower needle 221 which is adapted to extend into and close an aperture in the self aligning laterally shiftable seat disc 199 which closes the passage 197 in the bottom wall 195. The upper suface of the bottom wall 195 is plane and smooth to make a seal surface with the flat bottom face of the seat disc 199 surrounding the passage 197. The bottom flat surface of the seat disc 199 is held against the flat upper surface of the bottom wall 195 by the weak coil spring 222 which extends between the bottom 192 of the bellows 191 and the shoulder upon the rim of the seat disc 199. The flat surfaces allow the seat disc 199 and its aperture to shift laterally relative to the closed bottom 192 of the bellows 191 to align this aperture with the conically pointed valve needle 221.

The bellows 191 contains an interior spring 196 extending between the bottom 192 and an internal upper spring retainer 194. The conically pointed valve needle 221 is in the form of a pin which is pressed fitted through the central aperture in the closed bottom end 192 of the bellows 191 and extends coaxially upwardly a sufficient distance to serve as an internal bellows stop to engage the upper internal spring retainer 194 when the bellows is partly collapsed to prevent the complete collapse of the bellows 191.

The internal spring 196 within the bellows 191 together with the spring of the bellows itself and the weak coil spring 222 determine the pressure at which the bellows 191 will collapse. This collapsing pressure is selected to cause the valve 220 to be closed whenever the absolute pressure within the evaporator falls substantially below the freezing point of water. This pressure and temperature is determined by determining the temperature at which frosting of the evaporator will begin under adverse operating conditions. A suitable setting is about 29 to 30 lbs. gage of 43.2 to 44.2 lbs. per square inch absolute. Additional calibration is provided by the press fit location of the bellows support 193 which determines the location of the upper end of the bellows 191.

The portion of the vertical chamber 141 formed between the outside of the housing 171 and the housing 30 connects through the restricted equalizing passage 139 with the chamber beneath the diaphragm 84 to provide a pressure equalizing connection. This chamber is also provided with an inlet connection 223 connecting through a conduit 225 with the bottom of the evaporator 80 for the purpose of insuring the return of any lubricant which may collect in the bottom of the evaporator. This chamber also is provided with an outlet 227 which connects through the suction conduit 229 with the inlet of the compressor 20.

The vertical chamber 48 is also provided with a threaded branch cavity 231 provided for the sight glass 233 for which a seal groove and seal 235 are provided. The sight glass 233 is held against the seal 235 by threaded ring 237. The sight glass 233 makes it possible to view the liquid at the entrance to the expansion valve 58. The removable wall 147 is provided with a test check valve core 239 and a threaded connection 241 for the connection of a gauge or any other device.

The hot compressed refrigerant is discharged from the compressor 20 through the conduit 22 to the condenser 24 where the refrigerant liquifies and flows through the liquid supply conduit 26 to the entrance 28 for flow into the cup-shaped receiver 36. The refrigerant is dehydrated by contact with the desiccant 38 in the receiver and thence flows upwardly through the screen 42, the tube 40, the chamber 48, into the bottom of the thermostatic expansion valve 58 for flow through the threaded cavity and passage 60 around the ball valve 70 into the transverse passage 74 and the annular chamber 48 to the outlet 76. From the outlet 76 the tube 78 conducts the liquid refrigerant to the evaporator 80 where the refrigerant evaporates under reduced pressure and flows through the tube 156 and the inlet connection 155 connecting with the notch 157 and the chamber 159 above the inverted camp member 98 at the top of the expansion value 58 and above the suction throttling valve 161. In the valve 161, the piston valve 175 is depressed by the pressure of the refrigerant in the chamber 159 sufficiently to uncover the outlet ports 177 in the housing 171 for flow through the chamber 141 through the outlet 227 which connects through the suction conduit 229 with the inlet of the compressor 20.

The temperature of the refrigerant in the notch 157 and the chamber 159 controls the pressure within the temperature responsive chamber above the diaphragm 84 containing the adsorbant 127 while the pressure in the suction chamber 141 is communicated through the restricted passages 139 and 138 with the chamber beneath the diaphragm 84. The result of these pressures normally is exerted through the operating pin 88 to push the ball valve 70 downwardly a sufficient amount to allow refrigerant flow around it to the evaporator for proper control of refrigerant flow to the evaporator.

The pressure within the chamber 187 against the bottom of the piston valve 175 together with the downward acting pressure in the chamber 159 and the notch 157 and the spring 189 control the position of the piston valve 175 to control the pressure within the evaporator 80 by controlling the refrigerant flow through the ports 177 to the chamber 141 and the suction conduit 229. The valve 220 controlled by the bellows 191 and its spring 196 maintains a substantially constant selected pressure within the chamber 187 which assures the maintenance of a substantially constant pressure in the chamber 159 above the piston valve 175. Because the piston valve 175 is between the evaporator 80 and the suction conduit 229, the chamber 141 is at a reduced pressure. This reduced pressure allows flow of lubricant collecting in the bottom of the evaporator 80 through the conduit 225 to the inlet connection 223 which connects to the chamber 141 and the suction conduit 229. This latter arangement porvides a positive pressure differential to provide adequate flow of lubricant to the compressor.

In the event it is desired to change the setting of either the thermostatic expansion valve or the suction throttling valve, they may be bodily removed by removing the C-snap ring 151 and the wall 147 and making either the desired adjustments or replacing the valves with other valves having the desired settings. The unitary structure can be placed at any convenient position in the engine compartment or in front of the engine compartment as long as the structure is maintained in a substantially vertical position and the removable wall 147 is conveniently accessible. The unitary structure serves ten different functions, namely, (1) A receiver for surplus liquid refrigerant;
(2) A desiccant for dehydrating the refrigerant for maintaining the refrigerant dry;
(3) An expansion valve for controlling the liquid flow from the receiver to the evaporator;
(4) A suction throttling valve for controlling the flow of evaporated refrigerant from the evaporator to the compressor;
(5) A heat exchanger for transferring heat from the warm liquid flowing through the expansion valve to the cold gas flowing through the suction throttling valve;
(6) An equalizer connection between the suction throttling valve chamber and the diaphragm chamber beneath the diaphragm of the thermostatic expansion valve;
(7) The top of the thermostatic expansion valve takes the place of the conventional thermostat bulb, since it contains the temperature sensitive material which is exposed to the cold refrigerant vapor entering through the inlet connection 155;
(8) Provides for the return of the lubricant from the bottom of the evaporator;
(9) Provides a sight glass for ascertaining the flow of liquid refrigerant to the expansion valve; and
(10) Provides a gage connection with a test check valve core.

The combining of all these functions to a single compact unitary structure reduces the cost by eliminating individual housings and individual connections and incorporates all in a convenient compact package.

While the embodiments of the invention as herein disclosed constitute preferred forms, it is to be understood that other forms might be adopted.

I claim:

1. A unitary structure adapted to be connected to the compressor, condenser and evaporator of refrigerating systems including a housing provided with a chamber having an inlet adapted to be connected to the outlet of the evaporator and having an outlet adapted to be connected to the compressor wherein the improvement comprises a suction throttling valve located in said chamber and fitting the walls between said inlet and said outlet for controlling the flow of refrigerant from the evaporator to the compressor, said chamber having a branch communicating with said inlet extending alongside and substantially parallel to said suction throttling valve, said branch having an inlet adapted to communicate with the outlet of the condenser and an outlet adapted to communicate with the inlet of the evaporator, and a refrigerant expansion valve having an integral thermosensitive means exposed to the fluid in said chamber and having a valve portion located in said branch substantially sealed to the walls thereof between the inlet and outlet therein for controlling flow from the inlet to the outlet.

2. A unitary structure adapted to be connected to the compressor, condenser and evaporator of refrigerating system including a housing provided with a chamber having an inlet adapted to be connected to the outlet of the evaporator and having an outlet adapted to be connected to the compressor wherein the improvement comprises a suction throttling valve located in said chamber and fitting the walls between said inlet and said outlet for controlling the flow of refrigerant from the evaporator to the compressor, said chamber having a branch communicating with said inlet extending alongside and substantially parallel to said suction throttling valve, said branch having an inlet adapted to communicate with the outlet of the condenser and an outlet adapted to communicate with the inlet of the evaporator, a refrigerant expansion valve having an integral thermosensitive means exposed to the fluid in said chamber and having a valve portion located in said branch substantially sealed to the walls thereof between the inlet and outlet therein for controlling flow from the inlet to the outlet, and a container having a rim sealed to said housing enclosing said inlet to said branch and forming a receiver, said housing also having a passage extending at one end to said container and adapted to be connected at its opposite end to the outlet of the condenser.

3. A structure as defined in claim 2 in which the container contains a tube extending from the inlet of said branch substantially to the bottom of the container, the bottom portion of said tube being provided with a screen.

4. A structure as defined in claim 2 in which the container contains a tube extending from the inlet of said branch substantially to the bottom of the container, the bottom portion of said tube being provided with a screen, said container also containing a porous bag substantially filled with a dehydrating material.

5. A unitary structure adapted to be connected to the compressor, condenser and evaporator of refrigerating systems including a housing provided with a chamber having an inlet adapted to be connected to the outlet of the evaporator and having an outlet adapted to be connected to the compressor wherein the improvement comprises a suction throttling valve located in said chamber and fitting the walls between said inlet and said outlet for controlling the flow of the refrigerant from the evaporator to the compressor, said chamber having a branch communicating with said inlet extending alongside and substantially parallel to said suction throttling valve, said branch having an inlet adapted to communicate with the outlet of the condenser and an outlet adapted to communicate with the inlet of the evaporator, and a refrigerant expansion valve having an integral thermosensitive means exposed to the fluid in said chamber and having a valve portion located in said branch substantially sealed to the walls thereof between the inlet and outlet therein for controlling flow from the inlet to the outlet, said expansion valve having diaphragm means exposed on one side to said thermosensitive means, and a pressure equalizer passage extending through said housing from said chamber containing said suction throttling valve to the opposite side of said diaphragm means.

6. A unitary structure adapted to be connected to the compressor, condenser and evaporator of refrigerating systems including a housing provided with a removable wall, wherein the improvement comprises two generally parallel chambers extending from said removable wall substantially side-by-side, said chambers both being exposed to said removable wall and at their ends adjacent said removable wall to each other, a removable suction throttling valve fitted into one of said chambers and having an inlet exposed to said removable wall, a removable thermostatic expansion valve sealed in the other chamber and having its thermosensitive element exposed to said removable wall, a cup-shaped container forming a receiver having its rim sealed to said housing, said housing being provided with a passage extending into said container and adapted to be connected to the outlet of the condenser, a tube extending from the lower portion of said container to said chamber containing said thermostatic expansion valve, said chamber having an outlet adapted to be connected to the inlet of the evaporator, said thermostatic expansion valve having means for controlling the flow from the inlet to the outlet in its chamber, the other chamber containing the suction throttling valve being provided with an outlet adapted to be connected to the inlet of the compressor, the removable wall being provided with a passage adapted to be connected to the outlet of the evaporator.

7. A unitary structure as defined in claim 8 in which the chamber containing the suction throttling valve is provided with an inlet adapted to be connected to a lower portion of the evaporator.

8. A unitary structure as defined in claim 8 in which a pressure equalizing passage extends between the two parallel chambers and the thermostatic expansion valve is provided with a diaphragm chamber containing a diaphragm dividing said diaphragm chamber into a pressure subchamber and a thermostatic subchamber containing a thermosensitive temperature pressure responsive means exposed to said removable wall, said pressure chamber being provided with passage means communicating with said pressure equalizing passage.

9. A flow controlling device including a housing having a first opening therein, a mounting within said housing provided with an enclosure having a flexible diaphragm means, said diaphragm means having a second opening therein and a wall means opposite said second opening supported by said mounting, a valve and stop in the form of a pin fitted into said second opening in said diaphragm means and extending in one direction toward said first opening in said housing and in the opposite direction a sufficient distance toward said wall means for engaging said wall means to stop the movement of the diaphragm means in the direction of said opposite wall means prior to complete collapse of said diaphragm means, the extension of said pin toward said first opening cooperating with said first opening in said housing to control the flow therethrough.

10. A flow controlling device including a housing having an opening therein, said housing being provided with substantially straight inner wall surfaces symmetrically located relative to said opening, an adjustable mounting member press fitted within said inner wall surfaces to a position related to said opening, said adjustable mounting being provided with an enclosure having a flexible diaphragm means, and a valve operated by said diaphragm means cooperating with said opening for controlling flow therethrough.

References Cited

UNITED STATES PATENTS

| | | | |
|---|---|---|---|
| 2,116,801 | 5/1938 | Shivers | 62—217 |
| 2,642,724 | 6/1953 | Carter | 62—225 |
| 3,119,559 | 1/1964 | Heidorn | 62—217 XR |
| 3,296,816 | 1/1967 | Weibel | 62—217 XR |
| 3,316,731 | 5/1967 | Quick | 62—217 XR |

MEYER PERLIN, Primary Examiner

U.S. Cl. X.R.

62—224, 225, 474, 509

PO-1050
(5/69)

UNITED STATES PATENT OFFICE
CERTIFICATE OF CORRECTION

Patent No. 3,525,234         Dated August 25, 1970

Inventor(s)     Richard E. Widdowson

It is certified that error appears in the above-identified patent and that said Letters Patent are hereby corrected as shown below:

Column 2, line 59, after "held" insert -- in place --.
Column 4, line 64, "camp" should read -- cap --.
Column 4, line 65, "value" should read -- valve --.

Column 5, line 26, "arangement" should read -- arrangement --; and "porvides" should read -- provides --.
Column 7, line 31, "8" should read -- 6 --.
Column 7, line 35, "8" should read -- 6 --.

Signed and sealed this 30th day of March 1971.

(SEAL)
Attest:

EDWARD M. FLETCHER, JR.
Attesting Officer

WILLIAM E. SCHUYLER, JR.
Commissioner of Patents